United States Patent [19]

Kunkle

[11] 3,980,547

[45] Sept. 14, 1976

[54] ELECTROKINETIC CELL

[75] Inventor: Albert C. Kunkle, Macon, Ga.

[73] Assignee: J. M. Huber Corporation, Locust, N.J.

[22] Filed: Dec. 13, 1974

[21] Appl. No.: 532,660

Related U.S. Application Data

[63] Continuation of Ser. No. 436,414, Jan. 25, 1974, abandoned, and a continuation-in-part of Ser. No. 403,191, Sept. 26, 1973, abandoned, and a continuation-in-part of Ser. No. 263,376, June 5, 1972, abandoned.

[52] U.S. Cl.............................. 204/301; 204/151; 204/180 R
[51] Int. Cl.² ........................................ B01D 13/02
[58] Field of Search................. 204/180 R, 301, 151

[56] References Cited
UNITED STATES PATENTS 1,229,203    6/1917   Schwerin....................... 204/180 R
1,719,984    7/1929   Klein et al..................... 204/180 R Primary Examiner—John H. Mack
Assistant Examiner—A. C. Prescott
Attorney, Agent, or Firm—August E. Roehrig, Jr.; Harold H. Flanders

[57] ABSTRACT

An electrokinetic cell for the separation of solid particles from an aqueous suspension thereof, the cell being equipped with an anode and cathode separated by a semi-permeable membrane impermeable to clay particles which divides the cell into anode and cathode compartments. Upon application of direct current to the anode and cathode, clay particles in a suspension fed to the anode compartment deposit electrophoretically on the anode. Water contained in the suspension and entrained in the deposit simultaneously migrates electrosomotically therefrom and through the membrane where it is collected in the cathode compartment and thereafter removed from the cell.

9 Claims, 3 Drawing Figures 3,980,547

ELECTROKINETIC CELL

REFERENCE TO RELATED APPLICATIONS

This application is a continuation of application Ser. No. 436,414 filed Jan. 25, 1974 now abandoned, and is a continuation-in-part of copending application Ser. No. 403,191 filed Sept. 26, 1973 now abandoned, and of its parent application Ser. No. 263,376 filed June 5, 1972 now abandoned, in the name of Albert C. Kunkle.

BACKGROUND OF THE INVENTION

This invention relates to an apparatus for the separation of solid particles from aqueous suspensions thereof and, more particularly, to an electrokinetic cell wherein particle separation is effected simultaneously by electrophoresis and electroosmosis.

Clays such as kaolin, bentonite and the like are widely used as adsorbents, pigments, catalysts paper fillers and the like. These clays generally occur in geological deposits as mixtures with inert foreign materials, and it is necessary to separate the clay material before the clay is utilized in commercial applications.

In effecting the separation, the crude clay is dispersed in water with the aid of dispersing chemicals such as sodium silicate, sodium hexametaphosphate, sodium tripolyphosphate and tetrasodium pyrophosphate and the clay slurry is blunged, degritted, classified and leached to effect removal of the undesired foreign materials. Following these steps, the clay is filtered to remove the leaching and dispersing chemicals and to produce a solid filter cake containing 50% to 60% clay. This 50% to 60% solids cake is the redispersed and spray dried or otherwise dried in the flocculated state. For various economic reasons, it is desirable in the clay industry to ship slurries containing 70% solids. Therefore, it is conventional in the clay art to add approximately 35% to 50% spray dried clay to a 50% to 60% solids redispersed filter cake to yield a 70% solids slurry. The addition of spray dried clay to clay filter cake to prepare a 70% solids slurry for shipment adds significantly to the cost of the shipped slurry due to the relatively high costs of preparing the spray dried clay. The art, therefore, has been continually seeking to effect methods whereby clay filter cakes containing 70% clay can be directly obtained from clay suspensions without the addition of spray dried clay.

Among the methods which the art has investigated in its attempt to obtain a more concentrated, i.e., 70% solids clay cake, has been the use of electrokinetic phenomenon such as electrophoresis and electroosmosis.

Most solid materials when suspended as fine particles in a liquid acquire an electric charge. By applying a DC (Direct Current) electric field between two electrodes immersed in the particle suspension, the particles are caused to travel toward one of the electrodes and form a deposit thereon. This travelling of solid particles through a liquid due to the application of DC is referred to in the art as electrophoresis. When under the influence of a direct current potential, water or other liquid medium is caused to migrate through a stationary porous diaphragm toward a charged electrode. This phenomenon is referred to in the art as electroosmosis. Both electrophoresis and electroosmosis have been applied to the separation of clays from aqueous suspensions thereof. When applied to aqueous clay suspensions, electrophoresis is generally used to effect the deposition of the suspended clay material on a charged electrode, whereas electroosmosis functions as an aid in consolidating and concentrating the electrophoretically deposited clay by removal of the entrained water from the deposit.

The following patents are representative of prior art electrokinetic cells: British Pat. No. 936,805 (1963); U.S. Pat. Nos. 670,350; 720,186; 894,070; 972,029; 993,888; 1,121,409; 1,133,967; 1,156,715; 1,174,946; 1,233,713; 1,229,203; 1,235,063; 1,266,329; 1,326,106; 2,099,328; 2,236,861; 2,295,476; 2,440,504; 2,448,848; 2,485,335; 2,500,878; 3,396,097; 3,412,002; 3,412,008; 3,455,805; 3,497,439; 3,533,929; 3,556,969; 3,589,991; and 3,616,453.

While the effect of electrophoresis and electroosmosis on clay separation has long been known, apparatus based on these phenomena are not commercially successful by the present day art. Attempts by the art to replace the filtration apparatus conventionally used to obtain clay filter cakes from clay suspensions with electrophoretic or electroosomotic devices have not been notably successful, particularly from an economic standpoint.

SUMMARY OF THE INVENTION

In accordance with the present invention, there is provided an electrokinetic cell for the separation of solid particles from aqueous suspensions thereof, the cell being comprised of an anode and cathode, the anode and cathode being separated by a semi-permeable membrane impermeable to the passage of clay particles, the anode forming an anodic compartment with the membrane and the cathode forming a cathode compartment with the membrane. The aqueous suspensions are fed to the anodic compartment. When a direct current field is applied between the anode and cathode of the cell, solid particles are electrophoretically deposited on the anode while simultaneously the water of the suspension and the water entrained in the solid deposit migrates electroosmotically through the semi-permeable membrane and into the cathode compartment. Means are provided to circulate electrolyte through the cathodic compartment to enhance the electroosmotic effect of the cell as well as to provide the removal of water collected in the cathodic compartment.

Using the apparatus of the present invention for the separation of clay from its suspension, it is possible to effect the electrophoretic deposition of clay at the anode of an electrokinetic cell simultaneous with the electroosmotic dewatering of both the deposited clay cake and the effluent slurry remaining after electrokinetic activation of the clay suspension fed to the cell.

BRIEF DESCRIPTION OF THE DRAWINGS

Objects of the invention, together with additional features contributing thereto and advantages accruing therefrom, will be apparent from the following description of several embodiments of the invention when read in conjunction with the accompanying drawings, wherein.

PREFERRED EMBODIMENTS

Figure 1:
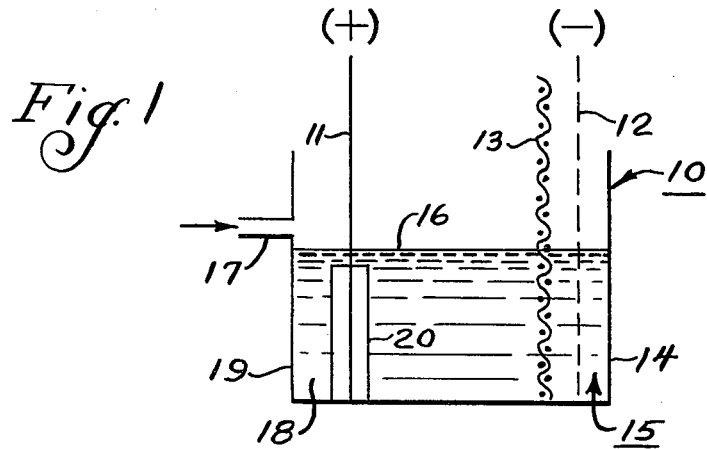
FIG. 1 is a schematic cross-sectional representation of one embodiment of an apparatus of the present invention.

Referring now to the drawings, FIG. 1 shows an electrokinetic cell 10 consisting of a solid anode 11 and a cathode 12 separated by semi-permeable membrane 13. The anode and cathode are connected to a source of DC, not shown. The semi-permeable membrane 13 and the cell wall 14 from cathode compartment 15 containing the cathode 12 therein.

In operation, the solid particle suspension 16 to be electrokinetically separated, is introduced into the cell 10 by a suitable liquid inlet means 17 to the anode compartment 18 formed between the cell wall 19 and the membrane 13. Upon activation of the cell with DC, a solids deposit 20 is electrophoretically deposited from the suspension 16 onto the anode 11 while a portion of water is simultaneously electroosmotically removed from the suspension 16 and the deposit 20 and migrates through the membrane 13 and is collected in the cathode compartment 15.

Figure 2:
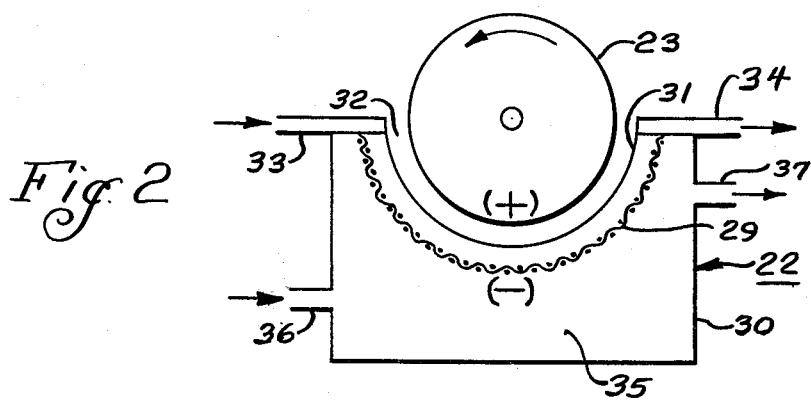
FIG. 2 is a schematic cross-sectional representation of a second and preferred embodiment of an apparatus of the present invention.
Figure 3:
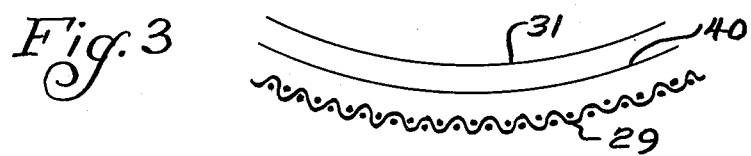
FIG. 3 is a schematic cross-sectional detailed representation of the cathode structure preferred in the apparatus of the present invention.

In FIGS. 2 and 3, the electrokinetic cell 22, as shown, consists of a rotatably mounted, electrically conductive drum anode 23, the rotation thereof being effected by a source of power not shown. Spaced apart, but concentric with the drum 23, is stationary, foraminous, arcuate cathode 29 which is mounted on and insulated from the upstanding walls of tank 30. The anode 23 and cathode 29 are connected to a source of DC which is not shown. Spaced apart and separating the anode 23 and the cathode 29 is an arcuate semi-permeable diaphragm or membrane 31, also mounted on and insulated from the tank walls and concentric with the anode 23 and cathode 29. The membrane 31 is a flexible, tightly woven porous fabric which is adapted to permit diffusion of water, but is impermeable to the passage of the solid particles.

The space between the diaphragm 31 and the rotating drum 23 forms and defines an anodic compartment 32 to which liquid inlet means 33 (any suitable conduit or tube of dielectric, non-corrodable materials, for example, rubber or glass) extends from a suitable supply source (not shown) to the anodic chamber 32. Liquid outlet means 34 are also provided to discharge electrokinetically treated suspension from the anodic chamber 32 and comprises a conduit or tube of a material similar to that of the anodic chamber inlet 33 material.

The diaphragm 31 and the tank 30 define a cathodic compartment 35 containing the foraminous cathode 29 spaced inwardly from the diaphragm 31. The cathodic compartment 35 serves as a collection chamber for water electroosmotically separated from the suspension fed to the anodic compartment as well as entrained water electroosmotically removed from solids electrophoretically deposited on the drum. Electrolyte inlet means 36 and electrolyte outlet means 37 are provided in the tank 30 to allow water or other electrolyte to be conducted to and from the cathodic compartment 35.

In operation, the suspension to be electrokinetically separated is introduced by inlet means 33 into the anodic compartment causing portions of the drum 23 to become submerged in the suspension. Electrolyte solution is next admitted by electrolyte inlet means 36 into the cathodic chamber 35 in amounts sufficient to submerge the cathode 29 and contact the lower surface of the diaphragm 31. Upon activation of the rotating drum 23, the desired DC voltage is applied to the anode 23 and cathode 29. The solids suspension is then circulated through the anodic compartment 32. During the passage of the solids suspension in the anodic compartment 32 beneath the rotating drum, and while it is confined to the space between the anode 23 and the membrane 31, the solids in the suspension are caused to be electrophoretically deposited on and adhere to the surface of the drum anode 23. The direction of rotation of the drum 23 (indicated by the arrows in FIG. 2) advances the solids which have deposited on the drum surface during its passage through the anodic compartment 32 upwardly and over to the opposite side of the drum where the deposit is thereupon removed from the drum anode surface by any removal means such as a scraper or string which contacts the drum at the discharge point 28. Upon contact with the scraper or other removal means, the removed solids are discharged into a suitable solids collection means, not shown.

The rotation of the drum as well as the flow of solids suspension admitted to the anodic compartment is continuous so a clean drum surface is continuously presented to the solids suspension introduced into the electrokinetic cell.

Simultaneous with the electrophoretic deposition of the solids on the drum, the water entrained in the solid deposit immediately deposited on the drum as well as a portion of the water in the anodic chamber 32 is caused to migrate electroosmotically through the diaphragm 31 towards the cathode 29. Upon reaching the cathode 29, the water electroosmotically removed from the anodic chamber 32 percolates through the foraminous surface of the cathode and into the lower portion of the cathode compartment 35 from which it is then removed from the cell. As the entry of water into the electrolyte in the cathodic compartment may cause undesired dilution of an electrolyte solution, fresh electrolyte solution may be continuously circulated through the cathodic compartment 35 to maintain the electrolyte concentration at the desired level.

When effecting the separation of clay from clay suspensions, the electrolyte which is circulated through the cathode compartment of the electrokinetic cell is generally comprised of water having some mineral content or a dilute or weak acid such as sulfuric acid hydrochloric acid or phosphoric acid. The acid solution generally ranging in strength from 0.1% to 10% is metered into the cathode compartment of a rate sufficient to maintain the pH of the electrolyte in the cathode compartment between 2.0 and 7.

In constructing the apparatus of the present invention, the materials used in the fabriction of electrodes of the electrokinetic cell may be any of the well known corrosion resistant, conductive materials, metals and alloys but for ease of maintenance, the electrodes should be as resistant to chemical reaction with the clay suspension as is possible. Typical anode materials include antimony-lead alloy, platinum and conductive oxide coatings on tantalum or titanium and the like. Cathode materials include the cathodic metals such as stainless steel and aluminum.

The semi-permeable membrane used in the construction of the electrokinetic cell may be of any suitably permeable material such as Dacron, nylon, polyesters, polypropylene having a porosity of 0.5 to 4.0 cubic feet per minute.

As shown in greater detail in FIG. 3, a membrane preferred for use in the practice of the present invention is composed of Dacron and is insulated from the cathode 29 by an electrical insulator 40 such as a neoprene rubber spacer.

To achieve efficient operation of the electrokinetic cell of the present invention, it is advantageous that the spacing between the anode and the membrane be in the order of about 1 inch to about 1 ½ inch and preferably about 1 ¼ inch. The spacing between the cathode and the membrane is significantly less and is desirable in the order of 1/16 to ½ inch and preferably about 3/16 inch.

In utilizing the electrokinetic cell of the present invention for electrokinetic separation of clay suspensions, a current density of from about 0.05 to 0.35 amperes per square inch of effective electrode area is advantageously employed. At these current densities, the applied voltage will typically range from 25 to 100 volts.

The operation of the electrokinetic cell of the present invention is illustrated by the examples which follow:

EXAMPLE I

To an electrokinetic cell of the type illustrated in FIG. I was introduced into the anode chamber 18 a Central Georgia coating grade clay having a particle size of 92% finer than 2 microns, dispersed to minimum viscosity at 60% solids with tetrasodium pyrophosphate and having a pH of 6.5. A 0.1% sulfuric acid was employed in the cathodic compartment 15. The effective electrode area was 32 square inches. The spacing between the anode 11 and membrane 13 was 1 ¼ inches and the spacing between the cathode 12 and membrane 13 was ¼ inches. The material from which the membrane 13 was formed was Dacron and had an average porosity of 1.5 cubic feet per minute. The anode 11 was constructed of lead, and the cathode 12 was a 100 mesh screen of 316 stainless steel.

A series of runs were made delivering varying current densities and voltages to the cell. The clay deposition period in each run was 5 minutes. The deposition rate of the clay filter cake and the change in the weight per unit power with varying current density (amps/sq. in.) are recorded in Table I below.

TABLE I

| Current Density (amps/in2) | Voltage (volts) | Wet Cake Wt. (gms) | Cake Solids (%) | Clay Removed (%) | Gms Kw-Min | Total Clay Used (gms) |
| --- | --- | --- | --- | --- | --- | --- |
| 0.08 | 34 | 271 | 79 | 17 | 530 | 1260 |
| 0.11 | 42 | 351 | 79 | 20 | 360 | 1390 |
| 0.15 | 50 | 435 | 79 | 27 | 280 | 1270 |
| 0.19 | 57 | 520 | 79 | 31 | 244 | 1320 |
| 0.21 | 66 | 620 | 79 | 37 | 228 | 1320 |
| 0.25 | 75 | 697 | 78 | 40 | 186 | 1360 |
| 0.31 | 80 | 849 | 78 | 49 | 174 | 1350 |
| 0.37 | 95 | 963 | 78 | 55 | 131 | 1360 |

The data in Table I indicate that the amount of clay deposited increases with increasing current density, but the clay deposited per unit power decreases. The solids of the electrophoretically deposited cake did not change with current density and were on the order of 78–79%.

EXAMPLE II

To an electrokinetic cell of the type illustrated in FIG. 2 was introduced in the anode compartment 32 between the rotating anode 23 and the membrane 31 a Central Georgia coating grade clay having a particle size of 82% finer than 2 microns, having a 60%–61% solids concentration and a pH of 6.7. The spacing between the anode 23 and the semi-permeable membrane 31 was 1 ½ inches and the spacing between the cathode 29 and the membrane 31 was 3/16 inches. Membrane 31 was a Dacron cloth having an average porosity of 1.5 cubic feet per minute. A 3/16 inch neoprene web having 75% open area was used as the spacer between cathode 29 and membrane 31. The dimensions of the anode 23 were 1 × 1.5 feet and the drum was rotated at 0.16 rpm. The results of these runs are recorded in Table II below.

TABLE II

| Current Density (A/in2) | Slurry Effluent Solis (%) | pH | Cake Solids (%) | Rate* lbs. hr. | lbs. kw-hr. |
| --- | --- | --- | --- | --- | --- |
| .13 | 59.6 | 6.7 | 79.2 | 50 | 42 |
| .17 | 58.0 | 6.7 | 79.0 | 65 | 33 |
| .19 | 58.0 | 6.7 | 79.0 | 76 | 34 |
| .21 | 58.0 | 6.7 | 79.0 | 85 | 30 |

*Dry Clay

While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that this invention not be limited to the particular embodiments disclosed as the best mode contemplated for carring out this invention, but that the invention will include all embodiments falling within the scope of the appended claims.

What is claimed is:

1. An electrokinetic cell for separating solids from aqueous suspensions thereof comprising:
   an anode,
   a cathode,
   a semi-permeable membrane impermeable to solid particles arranged between the anode and cathode, the space between the anode and the membrane providing an anodic chamber and the space between the cathode and the membrane providing a cathodic chamber,
   inlet means to feed an aqueous suspensions of solid particles to the anodic chamber,
   outlet means to discharge solid particle depleted effluent from the anodic chamber,
   means, independent of said outlet means, to supply and discharge electrolyte to and from the cathodic chamber, and
   means for applying a direct current field between the anode and cathode.

2. The cell of claim 1 wherein the anode is rotatably mounted in the anode chamber and the cathode is fixedly mounted in the cathodic compartment.

3. The cell of claim 1 wherein the cathode is constructed of a foraminous material pervious to the passage of water.

4. The cell of claim 1, wherein a source of current to apply current through the cell yeilds a current density of about 0.05 to about 0.35 amperes per square inch of effective electrode area.

5. The cell of claim 1 wherein the spacing between the anode and membrane is in the order of about 1 to about 1 ½ inch.

6. The cell of claim 1 wherein the spacing between the cathode and membrane is about 1/16 to about ½ inch.

7. The cell of claim 1 wherein the membrane is a porous fabric having a porosity of 0.5 to 4.0 cubic feet per minute.

8. The cell of claim 1 wherein the spacing between the anode and membrane is approximately 1 ¼ inch.

9. The cell of claim 1 wherein the spacing between the cathode and membrane is approximately 3/16 inch.

* * * * *

UNITED STATES PATENT OFFICE
CERTIFICATE OF CORRECTION

PATENT NO. : 3,980,547
DATED : September 14, 1976
INVENTOR(S) : Albert C. Kunkle It is certified that error appears in the above-identified patent and that said Letters Patent are hereby corrected as shown below:

In the Abstract, third line from bottom, "electrosomotically" should be -- electroosmotically --.

Column 1, line 19, following "catalysts" insert -- , --.

Column 1, line 33, following "60% solids cake is" the word "the" should be -- then --.

Column 3, line 11, following "14", the word "from" should be -- form --.

Column 4, line 47, following "sulfuric acid" insert -- , --.

Column 4, line 54, "fabriction" should be -- fabrication --.

Column 6, in Table II, heading of second column, "Solis" should be -- Solids --.

Column 6, line 36, "carring" should be -- carrying --.

Signed and Sealed this

First Day of March 1977

[SEAL]

Attest:

RUTH C. MASON
Attesting Officer

C. MARSHALL DANN
Commissioner of Patents and Trademarks